United States Patent
Torres et al.

(10) Patent No.: US 7,490,242 B2
(45) Date of Patent: Feb. 10, 2009

(54) SECURE MANAGEMENT OF AUTHENTICATION INFORMATION

(75) Inventors: Elias D. Torres, Lowell, MA (US); Christopher R. Vincent, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 1091 days.

(21) Appl. No.: 10/774,723

(22) Filed: Feb. 9, 2004

(65) Prior Publication Data

US 2005/0177731 A1    Aug. 11, 2005

(51) Int. Cl.
*H04L 9/00* (2006.01)
*G06F 17/24* (2006.01)
*G06F 17/25* (2006.01)
*G06F 7/04* (2006.01)

(52) U.S. Cl. ............... 713/182; 713/183; 713/184; 713/185; 713/186; 715/224; 715/225; 715/226; 726/5; 726/8; 726/17; 726/26; 380/281; 380/284

(58) Field of Classification Search ............ 726/5, 726/8, 17, 26; 380/281, 284; 713/182–186, 713/166; 715/224–226
See application file for complete search history.

(56) References Cited

U.S. PATENT DOCUMENTS

| | | | |
|---|---|---|---|
| 5,495,533 | A | 2/1996 | Linehan et al. |
| 6,134,658 | A | 10/2000 | Multerer et al. |
| 6,161,185 | A | 12/2000 | Guthrie et al. |
| 6,170,017 | B1 | 1/2001 | Dias et al. |
| 6,182,229 | B1 * | 1/2001 | Nielsen ............ 726/8 |
| 6,205,480 | B1 | 3/2001 | Broadhurst et al. |
| 6,484,263 | B1 * | 11/2002 | Liu ............ 726/8 |
| 6,823,327 | B1 * | 11/2004 | Klug et al. ............ 707/1 |
| 6,859,878 | B1 * | 2/2005 | Kerr et al. ............ 713/183 |

(Continued)

FOREIGN PATENT DOCUMENTS

JP    2000259566    9/2000

(Continued)

OTHER PUBLICATIONS

Netissimo, The Portable Netissimo Solution, Dec. 2, 2002, pp. 1-8.*

(Continued)

*Primary Examiner*—Syed A. Zia
*Assistant Examiner*—Trang Doan
(74) *Attorney, Agent, or Firm*—John E. Campbell; Stephen Bongini; Fleit Gibbons Gutman Bongini & Bianco P.L.

(57) ABSTRACT

A system, method and computer program product are provided for managing authentication information for a user. According to the method, a master digital key is received from the user, and authentication of the user is obtained based on the master digital key. There is received from the user a selection of one identity from among a plurality of identities that are stored for the user. Authentication information for the user is provided into an application or web page based on the one identity selected by the user. In one embodiment, the authentication information is provided by recognizing a web page for which authentication information is stored, and automatically filling the authentication information for the user into appropriate elements of the web page.

2 Claims, 8 Drawing Sheets

U.S. PATENT DOCUMENTS

| | | | |
|---|---|---|---|
| 6,865,680 B1* | 3/2005 | Wu et al. | 726/12 |
| 6,954,862 B2* | 10/2005 | Serpa | 726/5 |
| 7,136,490 B2* | 11/2006 | Martinez et al. | 380/284 |
| 7,171,615 B2* | 1/2007 | Jensen et al. | 715/222 |
| 7,185,272 B2* | 2/2007 | Pearce et al. | 715/207 |
| 7,191,466 B1* | 3/2007 | Hamid et al. | 726/3 |
| 7,200,804 B1* | 4/2007 | Khavari et al. | 715/230 |
| 7,206,998 B2* | 4/2007 | Pennell et al. | 715/224 |
| 7,310,733 B1* | 12/2007 | Pearson et al. | 713/185 |
| 2002/0023108 A1* | 2/2002 | Daswani et al. | 707/507 |
| 2002/0062342 A1* | 5/2002 | Sidles | 709/203 |
| 2002/0087894 A1* | 7/2002 | Foley et al. | 713/202 |
| 2002/0103827 A1* | 8/2002 | Sesek | 707/505 |
| 2002/0112170 A1* | 8/2002 | Foley et al. | 713/184 |
| 2002/0147912 A1* | 10/2002 | Shmueli et al. | 713/182 |
| 2002/0162009 A1* | 10/2002 | Shmueli et al. | 713/200 |
| 2002/0186249 A1* | 12/2002 | Lu et al. | 345/781 |
| 2004/0117662 A1* | 6/2004 | Ong | 713/202 |
| 2004/0158746 A1* | 8/2004 | Hu et al. | 713/202 |
| 2005/0033968 A1* | 2/2005 | Dupouy et al. | 713/183 |
| 2005/0044423 A1* | 2/2005 | Mellmer et al. | 713/201 |
| 2005/0204172 A1* | 9/2005 | Malcolm | 713/201 |

FOREIGN PATENT DOCUMENTS

WO     WO99/57866     11/1999

OTHER PUBLICATIONS

"Method for Determining Group Membership from Inside a Database," IBM Technical Disclosure Bulletin, vol. 32, No. 12, May 1990.

"Extensible User Authentication in a Computer Operating System," IBM Technical Disclosure Bulletin, vol. 34, No. 9, Feb. 1992.

"Temporary Global Passwords," IBM Technical Disclosure Bulletin, vol. 36, No. 3, Mar. 1993.

* cited by examiner

SECURE MANAGEMENT OF AUTHENTICATION INFORMATION

BACKGROUND OF THE INVENTION

1. Field of the Invention

This invention generally relates to the field of management of authentication information and more specifically to secure management of authentication information in a distributed computing environment.

2. Description of Related Art

As the popularity of the Internet increases, consumers are increasingly using the Internet to conduct business, organize their lives and access information. Thus, users today use the Web to do their banking, make stock trades, review their personal medical information and perform other tasks involving sensitive data. In order to protect consumers' sensitive data, web sites typically require a user to be authenticated in order to access confidential information. Authentication usually includes the provision of a user name, or login name, and a password. As a result, many Internet users today are required to manage a large number of user names and passwords for various web sites and security contexts. This can be time consuming to manage and tedious. It is common for users to keep their authentication information in an unsecured file, often just a plain text file, or a physical list There are several problems with unsecured files or lists. For example, most of these files and lists are not properly secured by any sort of security or encryption method. Second, these files keep growing in size and structure beyond what's manageable via a simple text editor. Other major drawbacks of these files are the lack of formal backup and the lack of availability across computing devices. Further, there is not an easy way for exposing any of the information in these files to other applications or users without compromising the entire file.

One known solution to this problem is provided by features of the Microsoft's Internet Explorer web browser (available form Microsoft Corporation of Redmond, Wash.). Internet Explorer stores passwords for a user and provides completion assistance for form values. However, Internet Explorer does not provide a mechanism for storing a form's complete state, such as the states of HTML elements such as checkboxes and radio buttons. Further, Internet Explorer only stores one set of authentication data per URL, and does not allow multiple identities to be associated with a single URL. Additionally, Internet Explorer makes authentication data part of the operating system configuration, and fails to address management of multiple identities across multiple computers.

Therefore a need exists to overcome the problems discussed above, and particularly for a way to more securely manage authentication information in a distributed computing environment.

SUMMARY OF THE INVENTION

Briefly, in accordance with the present invention, disclosed is a system, method and computer program product for managing authentication information for a user.

One embodiment of the present invention provides a method for managing authentication information for a user. According to the method, a master digital key is received from the user, and authentication of the user is obtained based on the master digital key. There is received from the user a selection of one identity from among a plurality of identities that are stored for the user. Authentication information for the user is provided into an application or web page based on the one identity selected by the user. In one embodiment, the authentication information is provided by recognizing a web page for which authentication information is stored, and automatically filling the authentication information for the user into appropriate elements of the web page.

Another embodiment of the present invention provides a system for managing authentication information for a user. The system includes a first interface that receives a master digital key from the user, and a second interface that receives from the user a selection of one identity from among a plurality of identities that are stored for the user. The system further includes an ID manager that provides authentication information for the user into an application or web page based on the one identity selected by the user. Authentication of the user is obtained based on the master digital key.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

DESCRIPTION OF THE PREFERRED EMBODIMENTS

1. Overview

Figure 1:
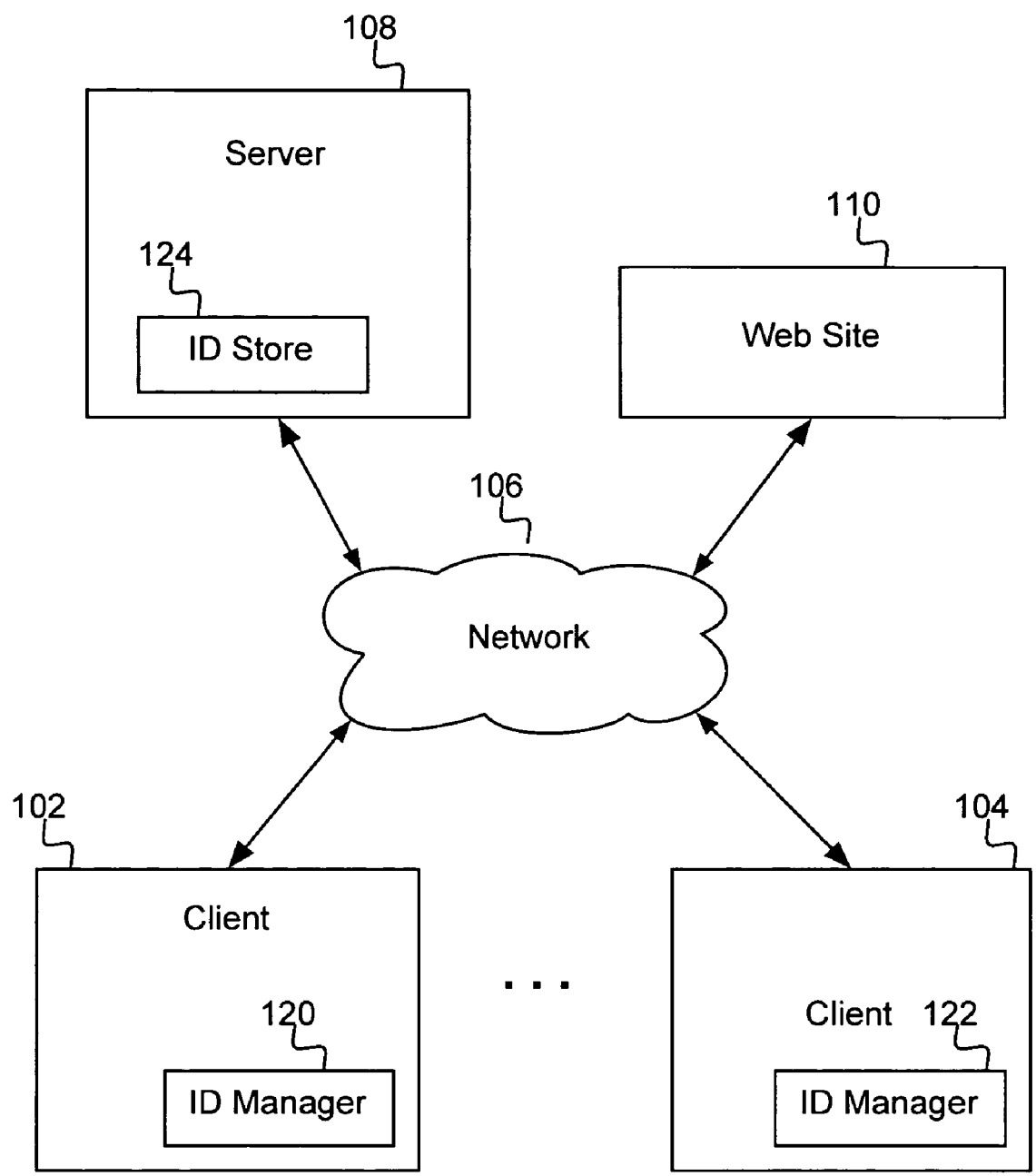
FIG. 1 is a block diagram illustrating the overall system architecture of a computer network according to one embodiment of the present invention.

The present invention, according to a preferred embodiment, overcomes problems with the prior art by providing an efficient and easy-to-implement method for providing secure management of authentication information and identities in a distributed computing environment.

One advantage of the preferred embodiment of the present invention is automated recognition or acquisition of an authentication prompt. The system analyzes the operation of an application, such as a web browser, in order to recognize an authentication prompt and facilitate the provision of authentication information, or credentials, into the application. In the instance of a web browser application, HTML web content of a web page is analyzed in order to recognize an authentication prompt and provide login, password and identity information into the web page. This is beneficial as the authentication process does not require user interaction and it makes the authentication process transparent to the user.

Yet another advantage of the preferred embodiment of the present invention is secure authentication information storage. All authentication information, including login, password and identity information, is stored in an encrypted state that is only accessible via a master digital key. This is beneficial as it allows a user to remember only one digital key (e.g., password) instead of multiple logins, passwords and identities.

Yet another advantage of the preferred embodiment of the present invention is automated execution of authentication operations. A user may browse their authentication information database, select a context or identity, and launch an authentication process. There is then facilitated the provision of authentication information, or credentials, into an application. This is beneficial as the authentication process does not require user interaction and it makes the authentication process appear to be seamless.

Yet another advantage of the preferred embodiment of the present invention is authentication information management in a distributed computing environment. A user's authentication information can be stored on more than one computer in a network, or on a server of a client-server network. Encrypted authentication information is automatically fetched based on the current user's login profile. This is beneficial as it allows a user to automate the authentication process from any location on a network having access to the stored authentication information.

Yet another advantage of the preferred embodiment of the present invention is compatibility through the use of plug-ins and APIs. Plug-ins and APIs allow authentication prompts from an application to be recognized and authentication information to be directly entered into the application on behalf of a user. This is beneficial as it allows the present invention to be utilized on a variety of platforms and with a variety of applications having authentication processes.

Yet another advantage of the preferred embodiment of the present invention is compatibility with autonomous applications that require the authentication information of a user in order to perform a task. An example of such an application is an auction assistant that automates the process of participating in an Internet auction on behalf of a user. An auction assistant typically would require a user to enter authentication information pertaining to an Internet auction site. The auction assistant would then utilize the authentication information to enter the Internet auction site and perform its duties. The preferred embodiment of the present invention provides access to the Internet auction site (by automatically providing authentication information to the internet auction site on behalf of the user) to the auction assistant without allowing the auction assistant access to the authentication information. This is beneficial as it allows the authentication information to remain secure and private from any entity other than the user and the site or application that authenticates the user.

For example, the system of one exemplary embodiment of the present invention interfaces with an auction assistant application by acting as a special type of proxy. More specifically, for authentication via web form (as descried below), the auction assistant makes an API call requesting login services for a specific URL and web form. This API call can be through an API to access a local instance of the authentication database or to a remote instance via a secured web service. The HTTP response, which typically contains a "session cookie" for authorizing subsequent requests, is handed back to the auction assistant. This allows the auction assistant to then make additional requests directly to the auction site, until the session cookie expires. For HTTP authentication (as described below), each request is proxied through the system of the present invention because each request contains sensitive authorization data. In both cases, the user may trust the auction assistant application to act on their behalf for a limited period of time, without disclosing permanent credentials. Further, if the auction web site requires completion of a second authorization form (with the same username/password) before performing critical operations (such as changing a password), the system of this embodiment allows the user to restrict the auction assistant application to authentication only via certain forms so as to allow bidding on auction items but not changing a password. This can prevent the hijacking of the user's account.

FIG. 1 is a block diagram illustrating the system architecture of a computer network according to one embodiment of the present invention. FIG. 1 shows client computers 102 and 104, which are typically utilized by a user to navigate web sites or execute applications that require authentication. FIG. 1 also shows server 108 and web site 110. Server 108 is any commercially available server system that allows client computers 102 through 104 to exist in a client-server relationship with the server 108. Web site 110 is a conventional web site, generally including a firewall, a web server and a database repository for serving web pages and information to users that visit and navigate through the web site 110.

FIG. 1 further shows located on server 108 an ID store 124, which is a storage module, such as a hard disk or other stationary or removable media, used for the storage of authentication and/or identity information. FIG. 1 also shows an identification (ID) manager 120 and 122 located within each client computer. The ID manager, such as ID Manager 120, is the main operating module and facilitates the capturing of authentication information from the user. The ID manager 120 further facilitates the storage and retrieval of authentication and/or identity information from the ID store 124, as well as the capturing of authentication prompts from web browsers and applications. Further, the ID manager 120 automatically authenticates a user for a browser or application. The functions of the ID manager 120 are described in greater detail below.

In one embodiment of the present invention, the computer systems of client computers 102 through 104 and server 108 are one or more Personal Computers (PCs) (e.g., IBM or compatible PC workstations running the Microsoft Windows operating system, Macintosh computers running the Mac OS operating system, or equivalent), Personal Digital Assistants (PDAs), hand held computers, palm top computers, smart phones, game consoles or any other information processing devices. In another embodiment, the computer systems of at least one server 108 and web site 110 are a server system (e.g., SUN Ultra workstations running the SunOS operating system or IBM RS/6000 workstations and servers running the AIX operating system). An exemplary computer system for client computers 102 through 104, server 108 and web site 110 is described in greater detail below with reference to FIG. 8.

In one embodiment of the present invention, the network 106 is a circuit switched network, such as the Public Service Telephone Network (PSTN). In another embodiment, the network is a packet switched network. The packet switched network is a wide area network (WAN), such as the global Internet, a private WAN, a local area network (LAN), a telecommunications network or any combination of the above-mentioned networks. In yet another embodiment, the network is a wired network, a wireless network, a broadcast network or a point-to-point network.

Figure 2:
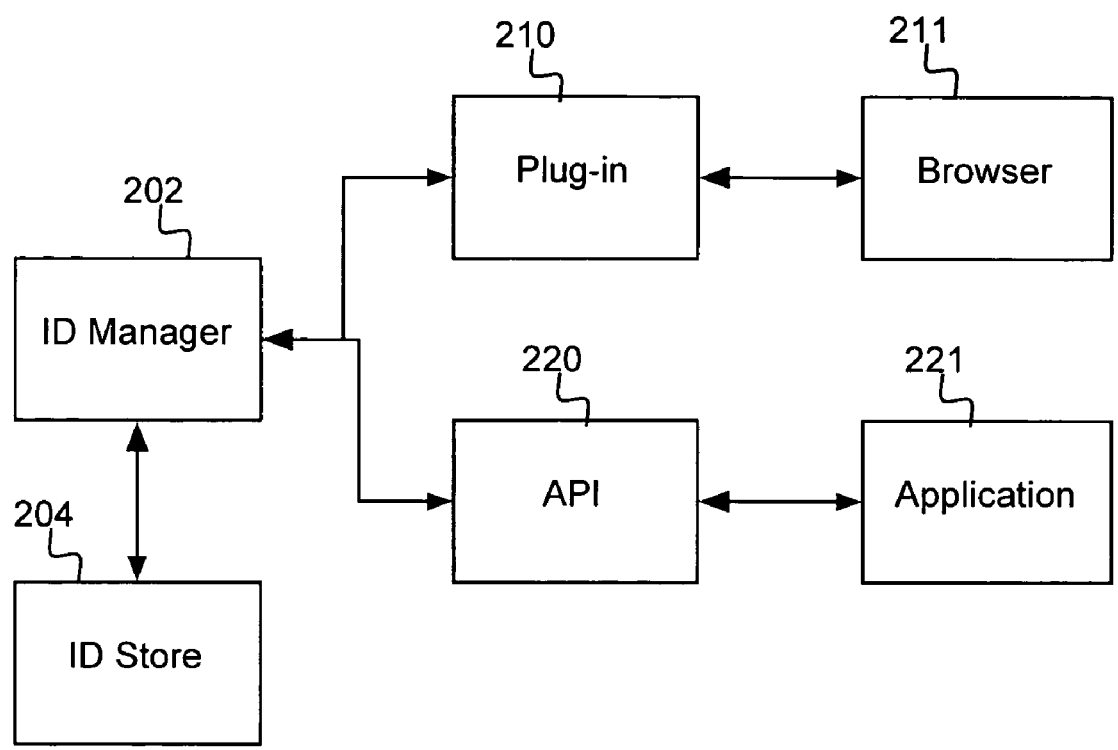
FIG. 2 is a detailed block diagram of a system for managing authentication information according to a preferred embodiment of the present invention.

FIG. 2 is a detailed block diagram of a system for managing authentication information according to a preferred embodiment of the present invention. FIG. 2 shows a conventional web browser 211, such as Microsoft Internet Explorer or Netscape Navigator, and a standard application 221, such as a database interface, a spreadsheet program or other financial software. FIG. 2 further shows an ID store 204 and an ID manager 202, both of which were described above. The functions of ID manager 202 are described in greater detail below.

Web browser 211 is any commercially available web browser, which is an application that is typically used to view web pages served by a web site over the Internet or other network. Application 221 is any application that prompts the user for authentication information. This typically occurs through the provision of one or more graphical windows that prompt the user to enter authentication information.

FIG. 2 further shows a plug-in 210 and an Application Programming Interface (API) 220. The plug-in 210 is a computer program used to alter, enhance, or extend the operation of a parent application program. Typically, web browser plug-ins interpret a particular file format or protocol. The plug-in 210 allows the ID manager 202 to capture, understand and control different aspects of the operation of the browser 211.

The API 220 is an interface by which the ID manager 202 accesses operating system and other services. The API is defined at source code level and provides a level of abstraction between the ID Manager 202 and the application 221 to ensure the portability of the code. The API can also provide an interface between a high level language and lower level utilities and services that were written without consideration for the calling conventions supported by compiled languages. The API 220 allows the ID manager 202 to capture and understand different aspects of the operation of the application 221.

In one embodiment of the present invention, all of the elements and modules of the system of FIG. 2 are located on one client computer, such as client computer 102 or client computer 104.

In another embodiment of the present invention, all of the elements and modules of the system of FIG. 2 are located on one client computer, except for the ID store 204, which is located on another computer or server. In this embodiment, elements 202, 210, 220, 211 and 221 are located on one client computer, such as client computer 102, while the ID store 204 is located on server 108 or another client computer. During the execution of the ID manager 202, information is retrieved from the ID store 204, as it is required by the ID manager 202.

This embodiment is advantageous, as it can be used in a distributed computing environment. This paradigm allows a user to float among devices on a network and retain authentication information identities while operating on different devices. This is also advantageous because it allows for the remote storage and possibly backup of the ID store 204. This also is beneficial as it allows for more than one copy of the ID store 204 to exist on the network, which reduces the possibility of information loss in the event of a system crash or other disaster.

In preferred embodiments of the present invention, the ID store 204 is encrypted so as to secure the authentication information stored within it. In one embodiment, the authentication information stored in the ID store 204 is stored as encrypted eXtensible Markup Language (XML) containing Hypertext Markup Language (HTML) form values for login Universal Resource Locators (URLs). If the information in ID store 204 is encrypted, the encrypted information can safely persist in unsecured storage, such as public LDAP directory servers.

In some embodiments, to allow the user to utilize multiple computers, the encrypted ID store 204 is stored in the user's LDAP directory entry. In such an embodiment, the system fetches encrypted authentication data based the current user's login profile. The stored entry attribute is updated when new authentication contexts are added and is checked for updates as specified by the user. A database version number is preferably stored as a separate LDAP entry attribute, in order to allow the system to efficiently determine if changes to the archived ID store 204 have been made.

One example of an entry in the ID store 204 is shown below:

```
<login uri="https://www.company.com/login.html">
    <form name="LoginForm" action="/cgi bin/login" method = "post">
        <input name="UserName">JohnSmith</input>
        <input name="Password">mypassword</input>
    </form>
</login>
```

The entry above identifies a form, or type of web page, named "LoginForm" which allows a user to log into a web site (specifically, the "www.company.com" web site) using a user name and password. The entry above specifies that the user name for the identified form is "JohnSmith" and that the password is "mypassword." User name and password authentication information is also referred to as credentials or an authentication data set.

As explained above, the ID store 204 can store all authentication information in one encrypted file. In such an embodiment, the client application must download and decrypt the entire ID store 204 in order to access any of the authentication information within that store. In another embodiment, individually encrypted authentication data sets are stored such that the client application only decrypts the authentication data set for a single web form. This is advantageous for compartmentalizing information, but makes it easier for third parties to determine which web sites are frequented. In general, the preferable approach depends on the security of the machine, whether users move between computers, and so on.

2. Management of Authentication Information

Figure 3:
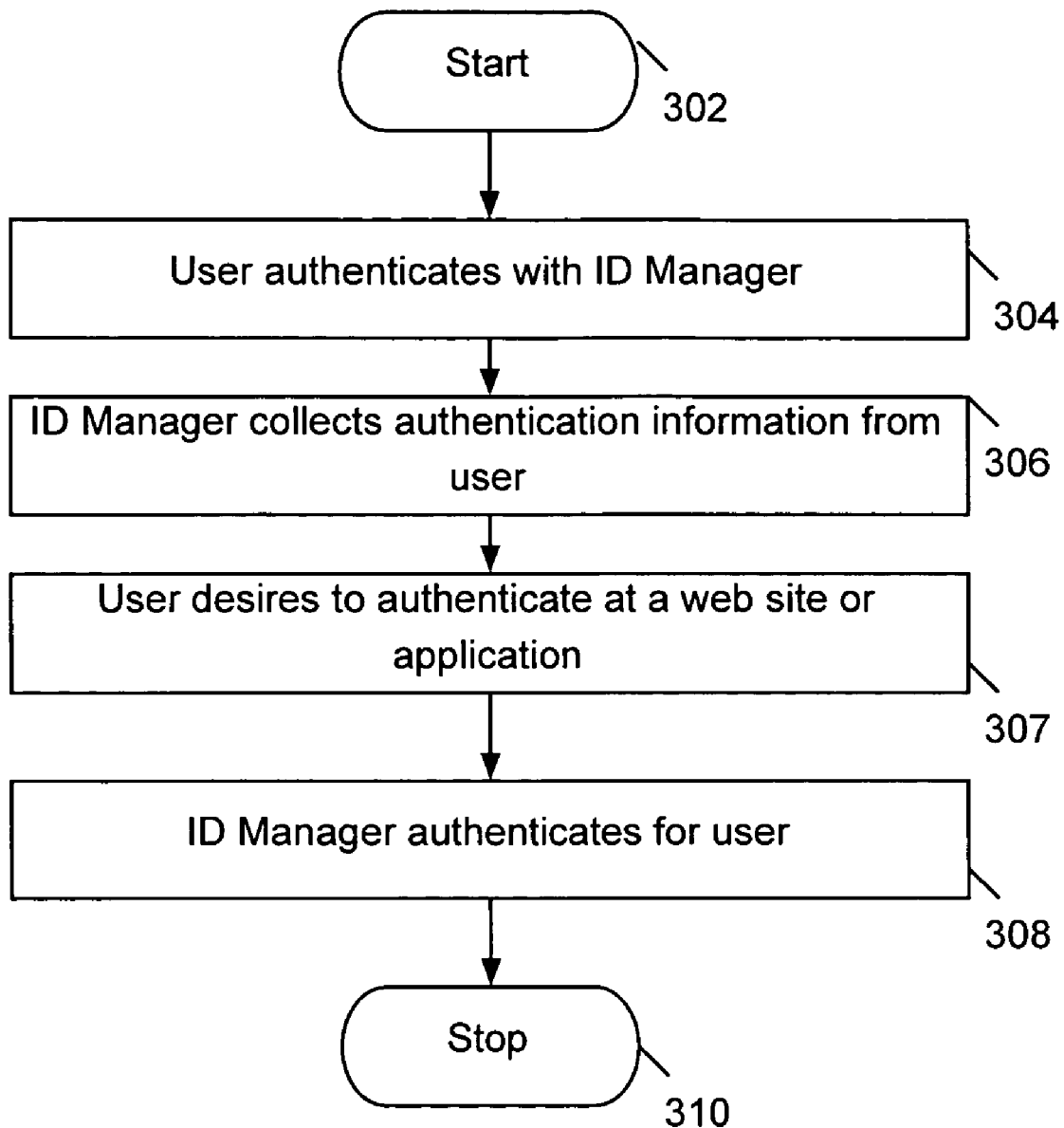
FIG. 3 is a flowchart depicting the overall operation and control flow of one embodiment of the present invention.

FIG. 3 is a flowchart depicting the overall operation and control flow of one embodiment of the present invention. The operation and control flow of FIG. 3 depicts the overall authentication information processes of the present invention. The operation and control flow of FIG. 3 begins with step 302 and proceeds directly to step 304.

In step 304, the user authenticates with the ID manager 202. Authentication with the ID manager 202 involves the provision of at least one of the following pieces of authentication information from the user to the ID manager 202, typically via a graphical interface: a login name, a master digital key, a group name, a domain name and a destination indicator. The master digital key that is used to "unlock" the ID store can be a password or any other type of digital key (such as a biometric signature or a physical device in the possession of the user). In general, a password is short and easy for people to remember, but may not provide enough encryption strength for some situations. Thus, more secure types of digital keys can be used depending on the desired security level of the encrypted database (i.e., the ID store 204). Preferably, in embodiments in which the ID store 204 is readily available to others, a long binary key is used as the master digital key, and this binary key is stored in a physically secure device and unlocked by a biometric signature, a shorter password, or the like. Alternatively, a biometric signature or a physical device in the possession of the user can be used as the master digital key to authenticate with the ID manager 202. In another preferred embodiment in which the ID store 204 is stored on a "secure" computer (such as a user's home PC), a simple password suffices as the master digital key.

Once the user has been authenticated with the ID manager 202, the secure ID store 204 is unencrypted and the ID manager 202 is prepared to recognize authentication prompts from applications so as to automate the authentication process for the user. Further details regarding the authentication of the user with the ID manager 202 are described in below with reference to FIG. 4.

In step 306, the ID manager 202 collects authentication information pertaining to applications 221 and web browsers 211. As the user enters authentication information into applications 221 and web browsers 211, the ID manager 202 recognizes the entrance of the authentication information and captures it. The recognition of the entrance of this information is accomplished via the use of APIs 220 and plug-ins 210, which allow the ID manager 202 to understand the actions and operations of the applications 221 and web browsers 211. APIs 220 and plug-ins 210 are described in greater detail above. The ID manager 202 captures the authentication information and stores it in the ID store 204 for later use in automating the authentication process. As described above, the authentication information that is collected includes at least one of the following data entered by the user, typically via a graphical interface: a login name, a password, a group name, a domain name and a destination indicator. Alternatively, or additionally, the user can enter authentication information directly into the ID Manager 202.

In another alternative, the system analyzes web content to aid the user in specifying the required authentication information for a URL. More specifically, the user enters (or otherwise supplies) a URL or other indicator of a web page into the ID manager 202. The ID Manager 202 downloads and analyzes the structure of that web page in order to determine the authentication information that is required by the web page. For example, this can be accomplished by searching for URL patterns and/or HTML FORM elements of an HTML web page. After analyzing the web page, the ID Manager 202 presents the user with a list of login information that is requested by the web page (e.g., in a new window). The user then selects the required login information, which is stored by the ID Manager 202 as an authentication data set for the corresponding URL. This data set is then used to authenticate the user with the URL. Thus, this alternative provides automated acquisition of authentication schema.

In step 307, the user desires to authenticate at a web site via a web browser 211 or with an application 221 via a graphical interface. In this step, the user navigates a web browser 211 to a web page that prompts the user for authentication information or initiates an application program 221 that prompts the user for authentication information. The ID manager 202 recognizes the authentication information prompt. The recognition of the authentication information prompt is accomplished via the use of APIs 220 and plug-ins 210, which allow the ID manager 202 to understand the actions and operations of the applications 221 and web browsers 211. Further details regarding the recognition of the authentication information prompt by the ID manager 202 are described below.

In step 308, the ID manager 202 proceeds to authenticate the user with the web site via a web browser 211 or with an application 221 via a graphical interface. In response to recognizing the authentication information prompt in step 307 above, the ID manager 202 proceeds to automate the authentication process for the user by authenticating him with the web browser 211 or the application 221. Further details regarding the authentication routine executed by the ID manager 202 are described below with reference to FIG. 7. In step 310, the control flow of FIG. 3 stops.

Figure 4:
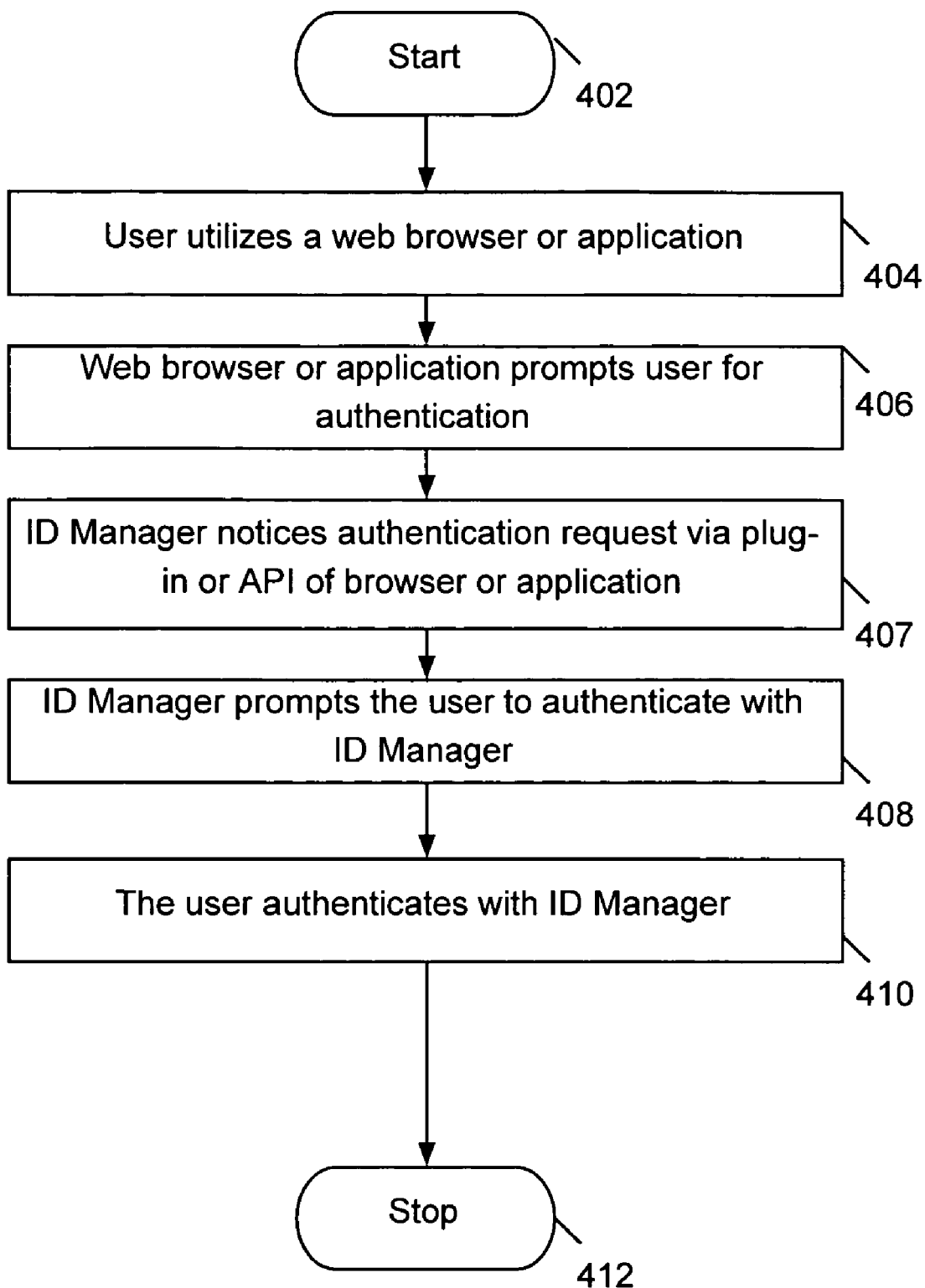
FIG. 4 is a flowchart depicting the operation and control flow of the authentication process of one embodiment of the present invention.

FIG. 4 is a flowchart depicting the operation and control flow of the authentication process of one embodiment of the present invention. The operation and control flow of FIG. 4 provides more detail with regard to the process by which a user authenticates with the ID manager for performing an automatic authentication. In this embodiment, the system uses a context-sensitive authentication agent to initiate an automated login. The operation and control flow of FIG. 4 begins with step 402 and proceeds directly to step 404.

In step 404, the user utilizes a web browser 211 to navigate web pages or an application program 221. Subsequently, in step 406, the web browser 211 or application program 221 prompts the user for authentication information. Such web authentication typically occurs either through HTTP authentication which uses one or more graphical windows to prompt the user to enter authentication information, or through a web form which uses HTML FORM elements on a web page to prompt for authentication information. (While authentication process is part of the protocol itself with HTTP authentication, the HTTP protocol does not actually know that authentication is occurring with web form authentication.) Example authentication windows are described below with reference to FIG. 5.

In step 407, the ID manager 202 recognizes the authentication information prompt. The recognition of the authentication information prompt is accomplished via the use of APIs 220 and plug-ins 210, which allow the ID manager 202 to understand the actions and operations of the applications 221 and web browsers 211. For example, in the case of authentication via a web form, the system of the preferred embodiment recognizes a URL pattern and HTML form structure (and later fills in the form values automatically, as explained below). In the case of HTTP authentication, the system of the preferred embodiment recognizes when the browser pops up a special window requesting username and password.

In one embodiment of the present invention, the recognition of the authentication information to provide to a web page is accomplished by the ID manager 202 by utilizing the information stored in the ID store 204. As described above, the authentication information stored in the ID store 204 can be stored as encrypted XML containing HTML form values for login URLs. One example of an entry in the ID store 204 is:

```
<login uri="https://www.company.com/login.html">
    <form name="LoginForm" action="/cgi bin/login" method = "post">
        <input name="UserName">JohnSmith</input>
        <input name="Password">mypassword</input>
    </form>
</login>
```

The entry above identifies a form, or type of web page, named "LoginForm" which allows a user to log into a web site (specifically, the "www.company.com" web site) using a user name and password. The entry above specifies that the user name for the identified form is "JohnSmith" and that the password is "mypassword." In order for the ID manager 202 to recognize an authentication prompt, the ID manager 202 looks for a match between the entry above and a web form that has been presented by a web browser 211. An example of an HTML form of a web page presented by a web browser 211 for authentication is shown below:

```
<html>
    <body>
        <form name="LoginForm" action="/cgi bin/login"
        method="post">
            UserName: <input type="text" name="UserName">
            <br>
            Password: <input type="password" name="Password">
            <br>
            <input type="submit" value="Log On">
            <input type="reset" value="Clear">
        </form>
    </body>
</html>
```

The ID manager 202 can recognize the HTML form above my matching the form name of the HTML form above to the form name of the entry in the ID store 204. Alternatively, the ID manager 202 can recognize the HTML form above by matching the two inputs (UserName and Password) of the HTML form above to the two inputs of the entry in the ID store 204.

Returning to FIG. 4, in step 408, in response to recognizing the authentication information prompt, the ID manager 202 prompts the user to authenticate with the ID manager 202 and select a security context. The ID manager 202 accomplishes this task by prompting the user to select a stored identity (i.e., security context) and/or enter authentication information, including a login name and a master digital key. Example authentication windows are described below with reference to FIG. 5. In step 410, the user enters the appropriate authentication information (e.g., master password) and selects a stored identity to continue the authentication process.

In the system of the preferred embodiment, there are two levels of identity management. A first level of identity management pertains to a "session identity", such as "work" or "home". A session identity is equivalent (though more convenient) to maintaining two authentication data set databases for different categories of access. A session identity is established when a user first authenticates with the ID manager. Within a session identity, a second level of identity management allows the user to specify multiple authentication data sets for a single web page or web form. This second level of identity management is the only case in which the user is prompted for identity selection during an automatic authentication. For example, if the user is already logged into the ID manager under the "home" session identity and goes to a URL to retrieve web mail, the ID manager would prompt the user to choose between second level identities (such as "personal email" and "auction site email) if the user has multiple web mail accounts at that URL. Thus, the system of the preferred embodiment recognizes an authentication form by URL and HTML structure so that the user only needs to choose between second level identities if for a particular web page the user has stored multiple authentication data sets under the same first level identity. In another embodiment, each user only has one session identity, so users do not select a stored identity when authenticating with the ID manager.

After the user has authenticated with the ID manager 202 and selects a stored session identity, the secure ID store 204 is unencrypted and the ID manager 202 automates the authentication process for the user. Authentication involves the provision of the proper authentication information for the user to the requesting web page or application, typically via a graphical interface or browser window. For example, with authentication via a web form, the system of the preferred embodiment fills in the form values automatically (such as a username and password, and possibly additional information). Additionally, the user specifies to the system whether or not the "login" button should be automatically pressed after the form is automatically filled in. With HTTP authentication, the system of the preferred embodiment automatically submits the requested authentication information.

Thus, in the embodiment of FIG. 4, the system uses a context-sensitive authentication agent to initiate an automated login. The context-sensitive authentication agent prompts for database access when the user browses to a web page that is associated with stored identity information.

Figure 5:
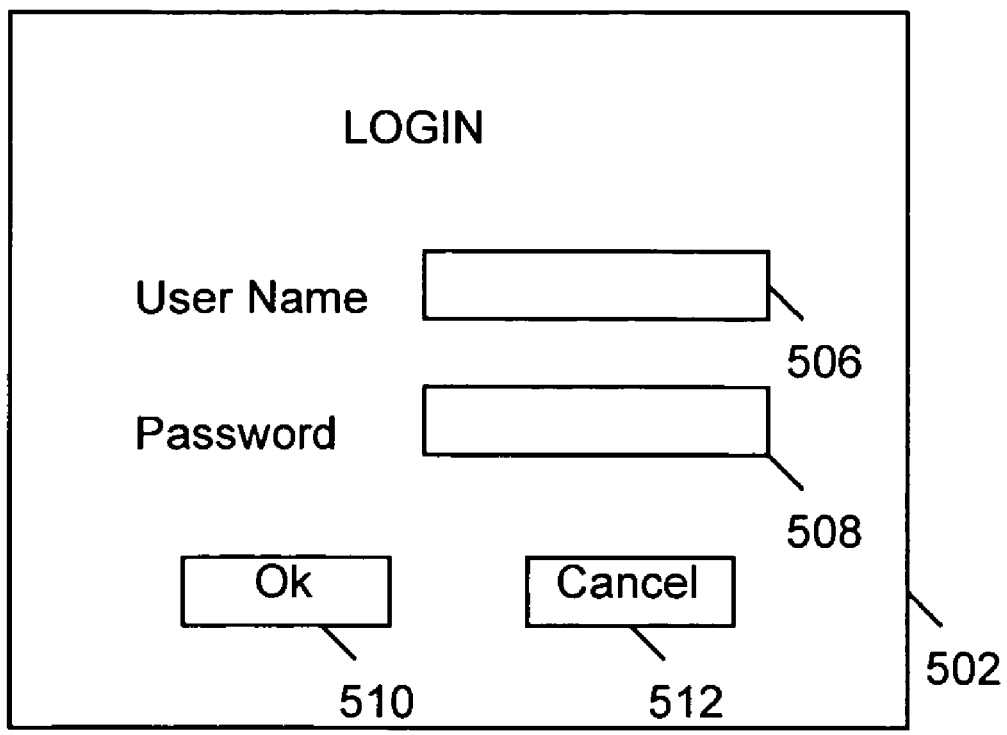
FIG. 5 is an illustration of exemplary authentication windows for the authentication process of FIG. 4.
Figure 5:
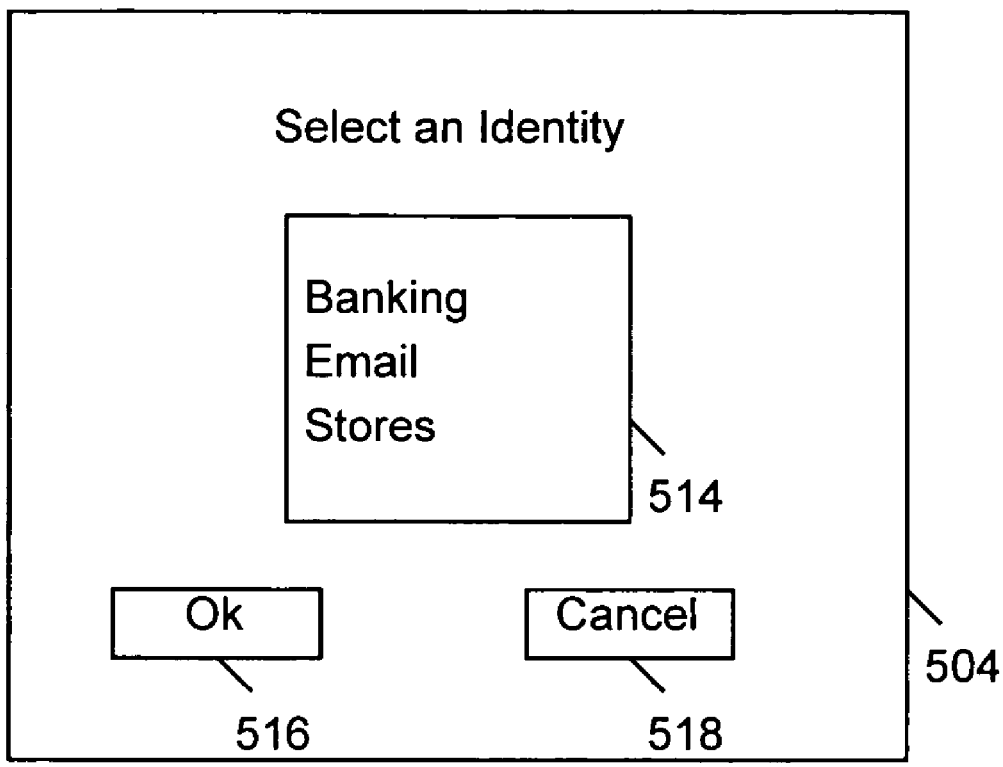

FIG. 5 is an illustration of exemplary authentication windows for the authentication process of FIG. 4. FIG. 5 shows a login window 502 for prompting a user to enter: 1) a user, or login, name into a text field 506; and 2) a master password into a text field 508. Login window 502 also shows an OK button 510 for proceeding with the authentication process and a cancel button 512 for terminating the authentication process. Though login window 502 only provides for the input of a user name and master password, further login windows can also provide for the input of other types of digital keys or other authentication information, such as a group name, a domain name or a destination indicator.

FIG. 5 further shows an identity window 504 for selecting a stored identity (i.e., security context) from a selection box 514. As described earlier, the present invention allows for the storage of a plurality of authentication data sets and/or security credentials for a plurality of identities. This allows one user to utilize more than one identity, each with one or more authentication data sets. For example, a user may have one identity (login/password) that is used for sensitive financial sites, another identity that is used for email sites and another identity that is used for online shopping. Thus, that user can maintain many login name-password combinations for different sites or sets of sites, but is only required to remember one login name-password pair—the authentication information for the ID Manager. Once the user is authenticated with the ID Manager, the appropriate identity is simply selected and the ID Manager automatically provides the proper authentication information to the web browser or application. Identity window 504 also shows an OK button 516 for proceeding with the authentication process and a cancel button 518 for terminating the authentication process.

Figure 7:
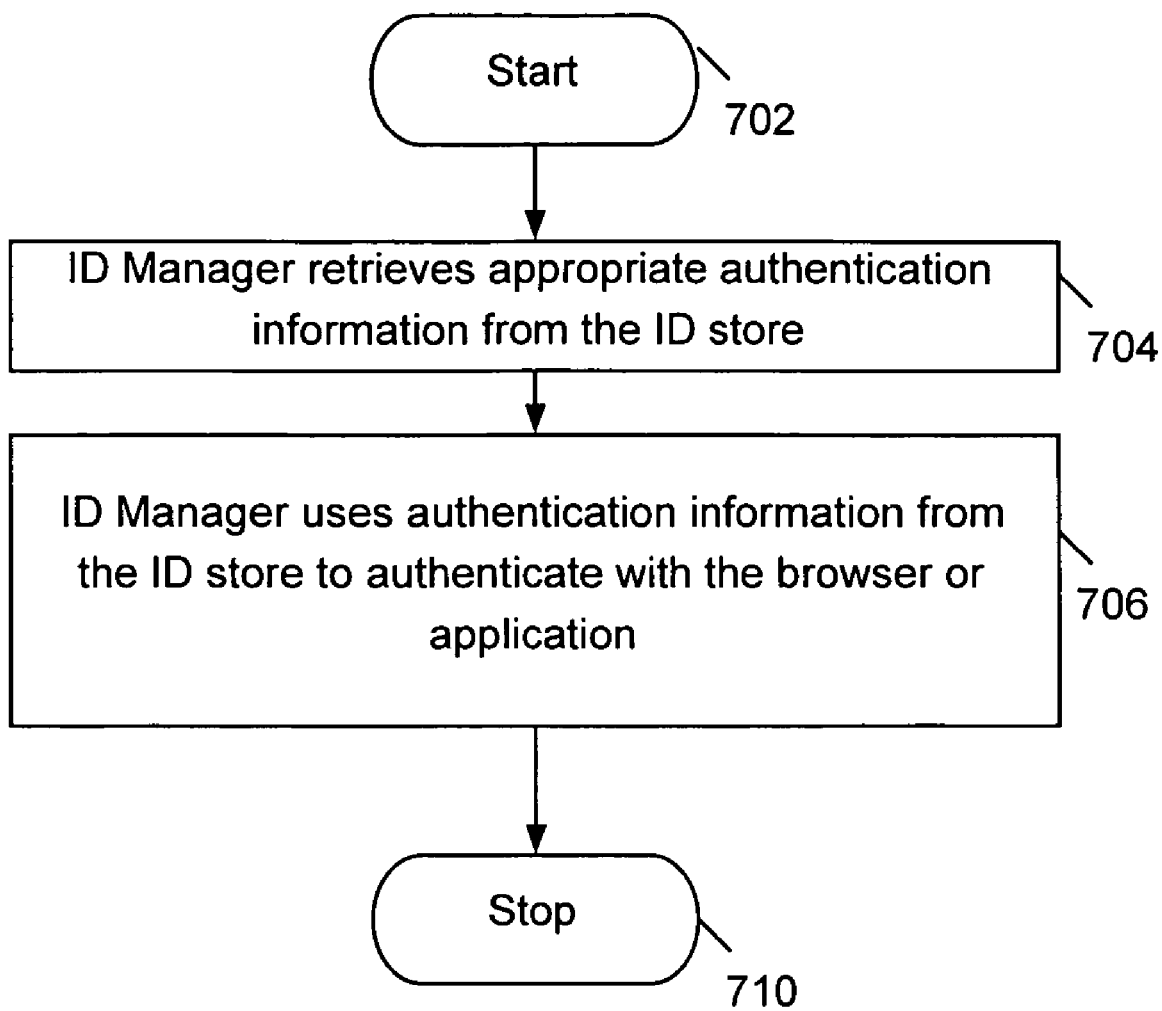
FIG. 7 is a flowchart depicting the operation and control flow of the ID Manager authentication process of one embodiment of the present invention.

FIG. 7 is a flowchart depicting the operation and control flow of the ID Manager authentication process of one embodiment of the present invention. The operation and control flow of FIG. 7 provides more detail with regard to step 308 of FIG. 3, depicting the process by which the ID manager authenticates with an application or web browser on behalf of the user. The operation and control flow of FIG. 7 begins with step 702 and proceeds directly to step 704.

In step 704, the ID manager 202 retrieves the appropriate authentication information from the ID store 204. The authentication information that is retrieved from the ID store 204 is based on the identity selected when the user authenticates with the ID manager 202, and on the web site or application. As described above, the preferred embodiment of the present invention allows for the storage of a plurality of authentication data sets and/or security credentials for a plurality of identities. This allows one user to utilize more than one identity, each with one or more authentication data sets. The selected identity will have, stored as an authentication data set, the user's authentication information (such as login name and password) for the web site or application requesting authentication. Thus, the authentication information is retrieved from the ID store 204 based on the selected identity.

In step 706, the ID manager 202 automatically authenticates the user with the requesting web site or application. That is, the ID manager 202 automatically provides the authentication information from the ID Store for the selected identity to the web site or application requesting it. For example, the ID manager 202 fills out text fields in an application 221 graphical interface or in a web browser 211. In step 710, the control flow of FIG. 7 stops.

Figure 6:
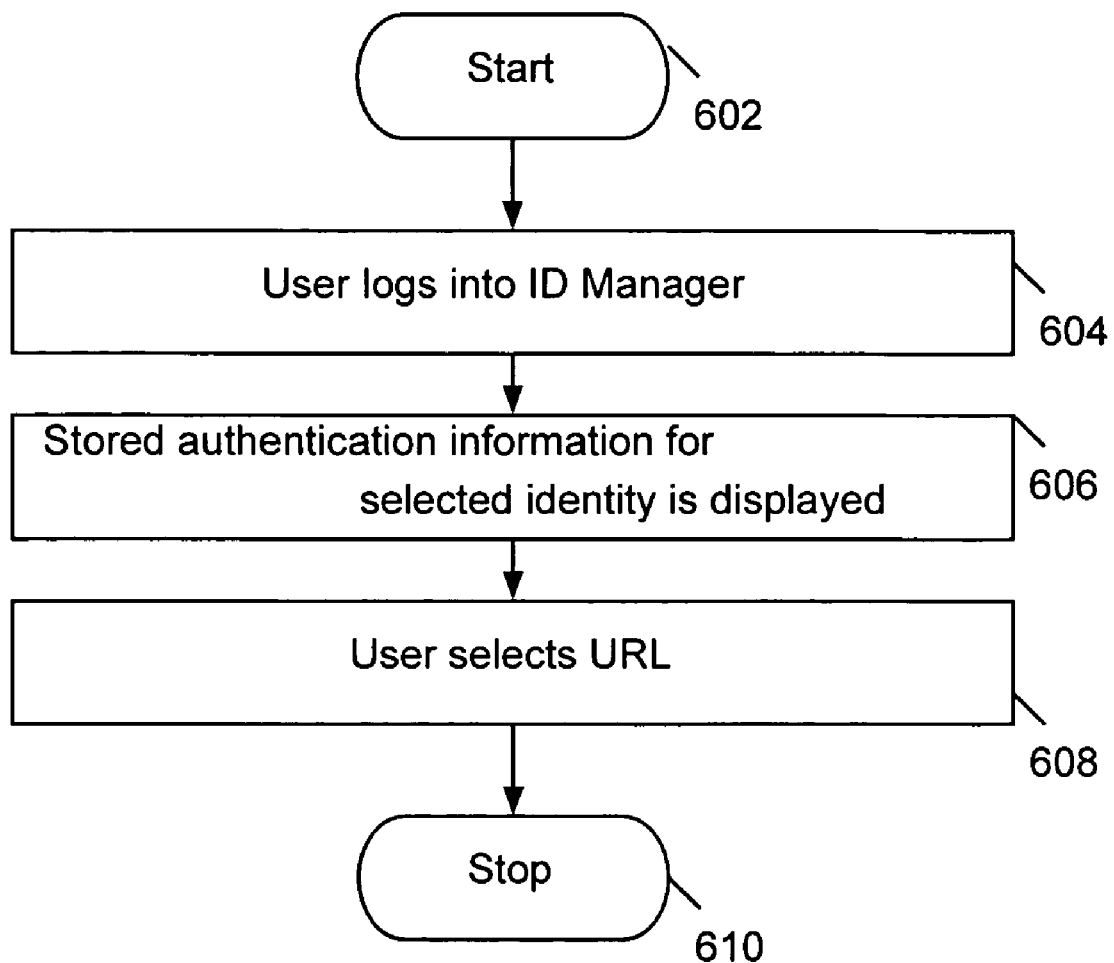
FIG. 6 is a flowchart depicting the operation and control flow of the authentication process of another embodiment of the present invention.

FIG. 6 is a flowchart depicting the operation and control flow of the authentication process of another embodiment of the present invention. The operation and control flow of FIG. 6 provides more detail with regard to an alternative embodiment of the process by which an automatic authentication is performed. In this embodiment, user input is used to initiate an automated login. The operation and control flow of FIG. 6 begins with step 602 and proceeds directly to step 604.

In step 604, the user logs into the ID manager 202. The user logs in by providing the ID manager 202 with login information that includes a master digital key, and then selecting one of the stored identities (such as the "banking" identity depicted in FIG. 5). In step 606, the ID manager 202 displays the stored authentication information for the selected identity to the user (e.g., as a list of web sites to which the stored authentication information applies). In step 608, the user browses this authentication information and selects one of the web sites from the stored information (e.g., by selecting a URL from the list). In response, the ID manager 202 launches a web browser (or other application) and opens the selected URL with the stored authentication information already filled into the web page. In step 610, the control flow of FIG. 6 stops. Thus, in the embodiment of FIG. 6, user input to the ID manager is used to initiate an automated login.

3. Exemplary Implementations

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product, which comprises all the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer program product on a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Figure 8:
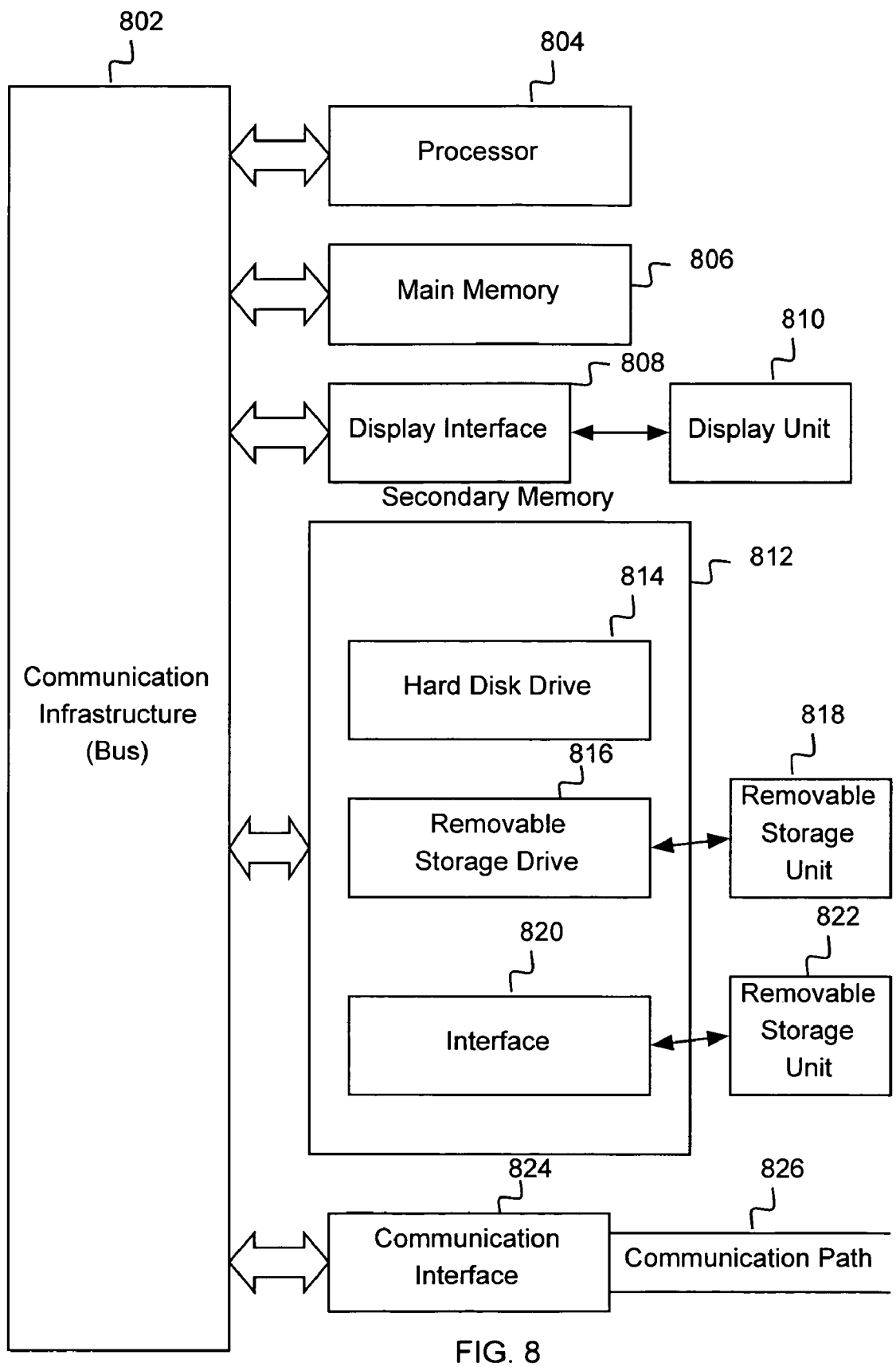
FIG. 8 is a block diagram of a computer system useful for implementing the present invention.

FIG. 8 is a block diagram of a computer system useful for implementing embodiments of the present invention. The computer system of FIG. 8 includes one or more processors, such as processor 804. The processor 804 is connected to a communication infrastructure 802 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 808 that forwards graphics, text, and other data from the communication infrastructure 802 (or from a frame buffer not shown) for display on the display unit 810. The computer system also includes a main memory 806, preferably random access memory (RAM), and may also include a secondary memory 812. The secondary memory 812 may include, for example, a hard disk drive 814 and/or a removable storage drive 816, representing a floppy disk drive, a magnetic tape drive, an optical disk drive, etc. The removable storage drive 816 reads from and/or writes to a removable storage unit 818 in a manner well known to those having ordinary skill in the art. Removable storage unit 818, represents, for example, a floppy disk, magnetic tape, optical disk, etc. which is read by and written to by removable storage drive 816. As will be appreciated, the removable storage unit 818 includes a computer usable storage medium having stored therein computer software and/or data.

In alternative embodiments, the secondary memory 812 may include other similar means for allowing computer programs or other instructions to be loaded into the computer system. Such means may include, for example, a removable storage unit 822 and an interface 820. Examples of such may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to the computer system.

The computer system may also include a communications interface 824. Communications interface 824 allows software and data to be transferred between the computer system and external devices. Examples of communications interface 824 may include a modem, a network interface (such as an Ethernet card), a communications port, a PCMCIA slot and card, etc. Software and data transferred via communications interface 824 are in the form of signals which may be, for example, electronic, electromagnetic, optical, or other signals capable of being received by communications interface 824. These signals are provided to communications interface 824 via a communications path (i.e., channel) 826. This channel 826 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 806 and secondary memory 812, removable storage drive 816, a hard disk installed in hard disk drive 814, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

Computer programs (also called computer control logic) are stored in main memory 806 and/or secondary memory 812. Computer programs may also be received via communications interface 824. Such computer programs, when executed, enable the computer system to perform the features of the present invention as discussed herein. In particular, the computer programs, when executed, enable the processor 804 to perform the features of the computer system. Accordingly, such computer programs represent controllers of the computer system.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A computer-implemented method for managing authentication information for a user, the method comprising the steps of:

encrypting authentication information entered into a web page by the user so as to produce encrypted authentication information, the authentication information including a password and a state of at least one checkbox or radio button;

storing the encrypted authentication information in an ID store on a remote computer; the ID store being stored in an LDAP directory entry of the user and a database version number being stored as a separate LDAP entry attribute, and the encrypted authentication information being stored in the ID store as encrypted eXtensible Markup Language containing Hypertext Markup Language form values for login Universal Resource Locators;

receiving a login name and a master digital key from the user;

authenticating the user based on the login name and the master digital key;

after the authenticating step, retrieving the encrypted authentication information from the ID store on the remote computer and unencrypting the encrypted authentication information so as to produce the authentication information;

recognizing an authentication information prompt on the web page by matching a form name associated with the authentication information from the ID store with a form name of an HTML form of the web page;

after the authenticating step, receiving from the user a selection of a stored identity of the user from among a plurality of stored identities for the user, at least two of the stored identities storing different authentication information for the user for the web page; and after the recognizing step, automatically submitting the authentication information for the user to the web page based on the stored identity selected by the user, wherein the master digital key is a binary key, the receiving step comprises receiving a biometric signature from the user to unlock the master digital key, and the automatically submitting step comprises:

retrieving the authentication information based on the stored identity selected by the user;

filling text fields in the web page with the authentication information including filling one of the text fields in the web page with the password;

setting the state of the at least one checkbox or radio button based on the authentication information; and automatically pressing a login button on the web page.

2. The method of claim 1, further comprising the steps of:

after the authenticating step, providing the user with a list of web pages for which authentication information is stored in the ID store;

receiving from the user a selection of the web page from the list of web pages; and in response to receiving from the user the selection of the web page, automatically opening the web page and then automatically submitting the authentication information for the user to the web page.

* * * * *